(12) United States Patent
Heindl et al.

(10) Patent No.: US 10,023,193 B2
(45) Date of Patent: Jul. 17, 2018

(54) VEHICLE WHEEL SLIPPAGE CONTROL

(71) Applicant: AGCO International GmbH, Hesston, KS (US)

(72) Inventors: Richard Heindl, Marktoberdorf (DE); Martin Brenninger, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/528,194

(22) PCT Filed: Jul. 31, 2015

(86) PCT No.: PCT/EP2015/067685
§ 371 (c)(1),
(2) Date: May 19, 2017

(87) PCT Pub. No.: WO2016/078782
PCT Pub. Date: May 26, 2016

(65) Prior Publication Data
US 2017/0313318 A1    Nov. 2, 2017

(30) Foreign Application Priority Data
Nov. 19, 2014   (GB) .................................. 1420529.8

(51) Int. Cl.
*B60W 30/18*    (2012.01)
*B60W 10/08*    (2006.01)
(Continued)

(52) U.S. Cl.
CPC ..... *B60W 30/18172* (2013.01); *B60C 23/002* (2013.01); *B60W 10/08* (2013.01);
(Continued)

(58) Field of Classification Search
CPC ........... B60W 30/18172; B60W 10/08; B60W 10/103; B60W 2300/15; B60W 2300/44;
(Continued)

(56) References Cited

U.S. PATENT DOCUMENTS 8,985,250 B1* 3/2015 Lussier ................ B62D 11/003
180/9.1
2001/0025610 A1* 10/2001 Weber ....................... F01P 7/04
123/41.12

(Continued)

FOREIGN PATENT DOCUMENTS

| DE | 4242109 A1 | 6/1994 |
|----|-----------|--------|
| EP | 2583842 A1 | 4/2013 |
| EP | 2583843 A1 | 4/2013 |
| EP | 2625049 A  | 8/2013 |

OTHER PUBLICATIONS

UK Intellectual Property Office, International Search Report for UK Priority Application No. GB1420529.8 dated May 11, 2015.
European Patent Office, International Search Report for International Application No. PCT/EP2015/067685, dated Nov. 12, 2015.

*Primary Examiner* — Jelani A Smith

(57) ABSTRACT

An agricultural vehicle and method of controlling the same are provided, the vehicle having a motive power unit providing a driving torque to at least one driven wheel and having at least one tire or track frictionally coupled with the periphery of the driven wheel. A vehicle operating parameter is controlled in dependence on the driving torque and a slippage characteristic relating the respective driving torque at which the frictional coupling between driven wheel and tire or track begins to slip for a range of vehicle operating parameter values. The operating parameter is suitably a tire pressure or track tension, and the control may involve reducing driving torque or increasing pressure/tension to prevent slipping.

15 Claims, 3 Drawing Sheets

(51) Int. Cl.
*B60W 10/103* (2012.01)
*B60C 23/00* (2006.01)

(52) U.S. Cl.
CPC ....... *B60W 10/103* (2013.01); *B60W 2300/15* (2013.01); *B60W 2300/44* (2013.01); *B60W 2400/00* (2013.01); *B60W 2510/083* (2013.01); *B60W 2510/09* (2013.01); *B60W 2510/105* (2013.01); *B60W 2520/26* (2013.01); *B60W 2530/20* (2013.01); *B60W 2710/083* (2013.01); *B60W 2720/26* (2013.01)

(58) Field of Classification Search
CPC ....... B60W 2400/00; B60W 2510/083; B60W 2510/09; B60W 2510/105; B60W 2520/26; B60W 2530/20; B60W 2710/083; B60W 2720/26; B60C 23/002
See application file for complete search history.

(56) References Cited

U.S. PATENT DOCUMENTS

| | | | |
|---|---|---|---|
| 2003/0121674 A1* | 7/2003 | Scarlett | A01B 63/111 172/2 |
| 2009/0030581 A1* | 1/2009 | Pollklas | A01D 41/127 701/50 |
| 2011/0057595 A1* | 3/2011 | Flanary | H02P 1/029 318/473 |
| 2013/0054078 A1 | 2/2013 | Anderson | |
| 2013/0228991 A1 | 9/2013 | Gerami-Manesch et al. | |
| 2014/0069092 A1* | 3/2014 | Elliott | F16H 61/431 60/445 |
| 2015/0005982 A1 | 1/2015 | Muthukumar | |

\* cited by examiner

VEHICLE WHEEL SLIPPAGE CONTROL

BACKGROUND OF THE INVENTION

Field of Invention

The invention is related to tractors and other agricultural vehicles having as running gear either conventional wheel rims mounting pneumatic tyres or flexible tracks frictionally driven by one or more drive wheels. More particularly, the invention relates to a control system and method for managing a slippage in such a running gear.

Description of Related Art

In agricultural vehicles having conventional wheel rims with pneumatic tyres, the air pressure in the tyres is a factor in the vehicles performance, and systems for automatic or semi-automatic adjustment of tyre pressure are known.

In EP 2 583 543A a system is described in which the air pressure, depending on traction-power requirements and slip between tyre and ground, is controlled to optimize power transmission between tyres and ground. However, the measuring of traction power (drag force) requires an increased technical measuring effort in the form of the installation of a force measuring bolt at the lower link arm of a three-point hoist: the system is not readily convertible to a connection over a hitch ball coupling. An additional issue with EP 2 583 543A is that the traction power is measured without consideration of rolling resistance—a reason why the relation between tyre pressure and wheel driver torque cannot be considered.

A further tyre pressure adjustment system is disclosed in WO2014/000932 of the applicant, in which a device and a procedure for measuring the wheel load with help of an appropriate sensor system are proposed. The measured wheel load is then used for the adjustment of the tyre pressure. The aim is, with appropriate wheel load, to reduce the ground pressure by reducing the tyre pressure in order to prevent an excessive soil compaction. The tyre pressure is adjusted depending on the axle load, because at decreasing tyre pressure, the load capacity is decreasing, too.

It is known that, especially at high speed, the tyres are heated up because of higher flexing work, and so the function of the tyres can be affected. Furthermore, the tyre pressure is increasing with higher heat input which is the basis for systems which control the tyre pressure depending on the speed of the vehicle. The aim is to ensure the function of the tyre and to keep the tyre pressure constant.

Whereas tyre pressure regulation depending on drag force/wheel load aims to optimize power transmission between tyre and ground, reduce ground pressure and maintain load capacity limits of the tyres, regulation depending on speed is concerned with protection against overheating of the tyres and compensating for the change in pressure due to heat input, whilst noting that the tyre is more stable with higher air pressure.

In recent years, the vehicle performance of agricultural machines, especially of wheeled and tracked (crawler) tractors, has grown. With this increased performance of tractors, requirements for traction power/drag force are increasing. While known systems for the regulation of the tyre pressure are only concerned with the optimization of contact between tyre and ground, the applicant has identified that not only the transmission capacity between tyre and ground, but also the transmission capacity (capability to transfer force from wheel to ground) between tyre and rim influences the adjustable tyre pressure.

In practice, an insufficient transmission capability between tyre and rim leads to a relative movement between both components in the form of slipping of the tyre on the rim well of the wheel. The applicant has further identified an analogous condition in crawler vehicles due to slipping of a frictionally driven track on a drive wheel.

The connection (resistant to torsion), between tyre and rim of conventional agricultural tyres, is only ensured because of the friction between tyre walls and the bead of rim (or more generally the contacting areas between the two parts). This friction is generally increasing with the inner tyre pressure. This friction enables that a particular torque can be transmitted between tyre and rim.

OVERVIEW OF THE INVENTION

It is an object of the present invention to provide a control system to regulate a vehicle operating parameter with consideration of force transmission capacity which avoids at least some of the above-mentioned disadvantages.

In accordance with the present invention there is provided a control system for an agricultural vehicle having a motive power unit providing a driving torque to at least one driven wheel and having at least one ground engaging member frictionally coupled with the periphery of the at least one driven wheel; the control system being arranged to control a vehicle operating parameter in dependence on a performance measurement of the vehicle and a slippage characteristic of the ground engaging member; characterised in that the performance measurement is of the driving torque and the slippage characteristic relates the respective driving torque at which the frictional coupling between driven wheel and ground engaging member begins to slip for each of a plurality of vehicle operating parameter values.

The driving torque measurement may be calculated from the oil pressure in a hydrostatic circular flow having at least one hydraulic pump driven by the motive power unit and at least one hydraulic motor connected with the at least one driven wheel. In such an arrangement the hydrostatic circular flow is preferably a hydrostatic branch of a hydro-mechanical power-split gear box. In an alternative configuration, where the motive power unit comprises an electric motor, the driving torque may be calculated from the current consumption of the motor.

The driving torque may be individually determined for separate driven wheels on the vehicle, or it may be determined on a per-axle basis.

The at least one ground engaging member may be a pneumatic tyre mounted on a rim of the at least one driven wheel with the vehicle operating parameter being an air pressure in the pneumatic tyre. As the slippage characteristic indicates that the current driving torque is approaching or has reached the level at which the tyre may begin to slip on the rim, the tyre pressure is increased in order to increase the friction between tyre and rim and thereby prevent slippage. Where there are multiple tyres, the air pressure may be controlled on a per axle or per tyre basis.

The control system may be further arranged to adapt or modify the vehicle operating parameter control by reference to one or more additional factors, such as a temperature indicating value. As will be described below with reference to a tyred vehicle, a temperature indicating value may be a direct temperature measurement for a tyre, or it may comprise one or more indirect measurements (such as ambient temperature, vehicle speed) from which tyre temperature may be derived.

Alternatively, the at least one ground engaging member may be a friction driven belted track operatively engaging the at least one driven wheel and having a preloading mechanism controllably operable to apply a variable tensioning force to the belted track, with the vehicle operating parameter being the applied tensioning force. As the slippage characteristic indicates that the current driving torque is approaching or has reached the level at which the track may begin to slip on the outer rim of the driven wheel, the track tension is increased in order to increase the friction between track and rim and thereby prevent slippage.

The present invention also provides an agricultural vehicle comprising a control system as claimed in any of attached claims 1 to 15.

Further in accordance with the invention there is provided a method of controlling an agricultural vehicle having a motive power unit providing a driving torque to at least one driven wheel and having at least one ground engaging member frictionally coupled with the periphery of the at least one driven wheel, the method comprising controlling a vehicle operating parameter in dependence on a performance measurement of the vehicle and a slippage characteristic of the ground engaging member; characterised in that the performance measurement is of the driving torque and the slippage characteristic relates the respective driving torque at which the frictional coupling between driven wheel and ground engaging member begins to slip for each of a plurality of vehicle operating parameter values.

Where the agricultural vehicle (which may have pneumatic tyres or crawler tracks as above) has a continuously variable transmission driven by the motive power unit, the method of controlling may further comprise calculating the driving torque from one or more measured operating parameters of transmission.

The method may further comprise generating a curve of the slippage characteristic by operating the vehicle at each of the said plurality of vehicle operating parameter values and, for each, increasing the driving torque and noting the torque value at which slippage between driving wheel and ground engaging member (tyre or track) commences.

BRIEF DESCRIPTION OF THE DRAWINGS

Further features and advantages of the present invention will become apparent from reading the following description of embodiments of the invention, given by way of example only, with reference to the accompanying drawings in which.

DETAILED DESCRIPTION OF THE INVENTION

Figure 1:
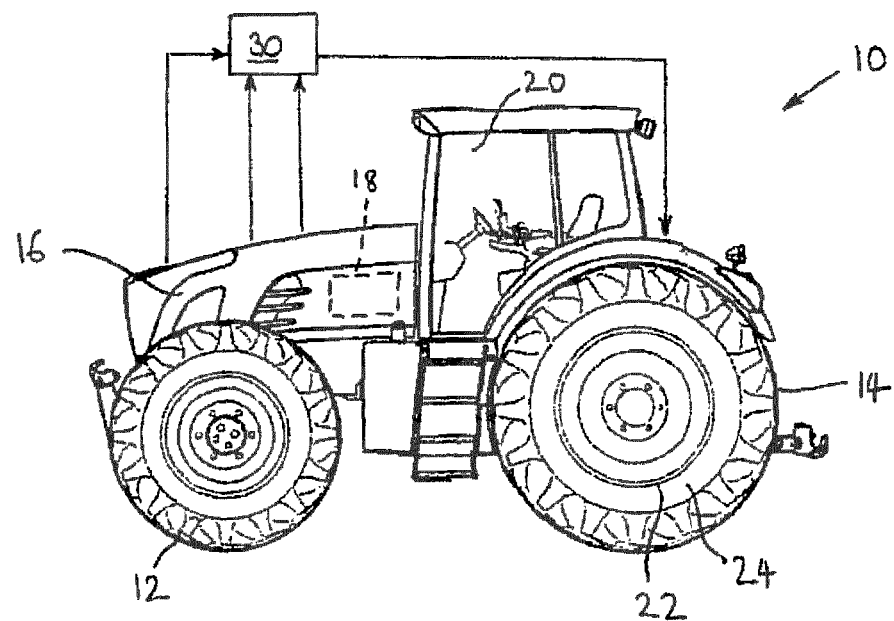
FIG. 1 is a side elevation of a first configuration of agricultural vehicle embodying the present invention.

FIG. 1 shows an agricultural vehicle, in the form of a wheeled tractor 10, having front wheels 12, rear wheels 14, an engine cover 16 enclosing a prime mover 18 in the form of an internal combustion engine, and operator cab 20. The tractor 10 has a chassis (not shown in the Figure for clarity) which provides support for the engine and a driveline which provides propulsive drive to at least the rear wheels 14, or both front and rear wheels 12, 14. The rear wheels 14 comprise a wheel hub carry a wheel rim 22 on which a pneumatic tyre 24 is mounted.

A control system, represented schematically at 30, includes data processing and storage components. The control system 30 is connected to receive vehicle operating performance measurement data, such as driving torque, fluid pressure, electrical current etc. The vehicle includes an automatic tyre pressure control arrangement (described below) which, under control of the control system 30, is operable to controllably vary the air pressure in the pneumatic tyre 24 in dependence on driving torque and a slippage characteristic between wheel rim 22 and tyre 24.

Figure 2:
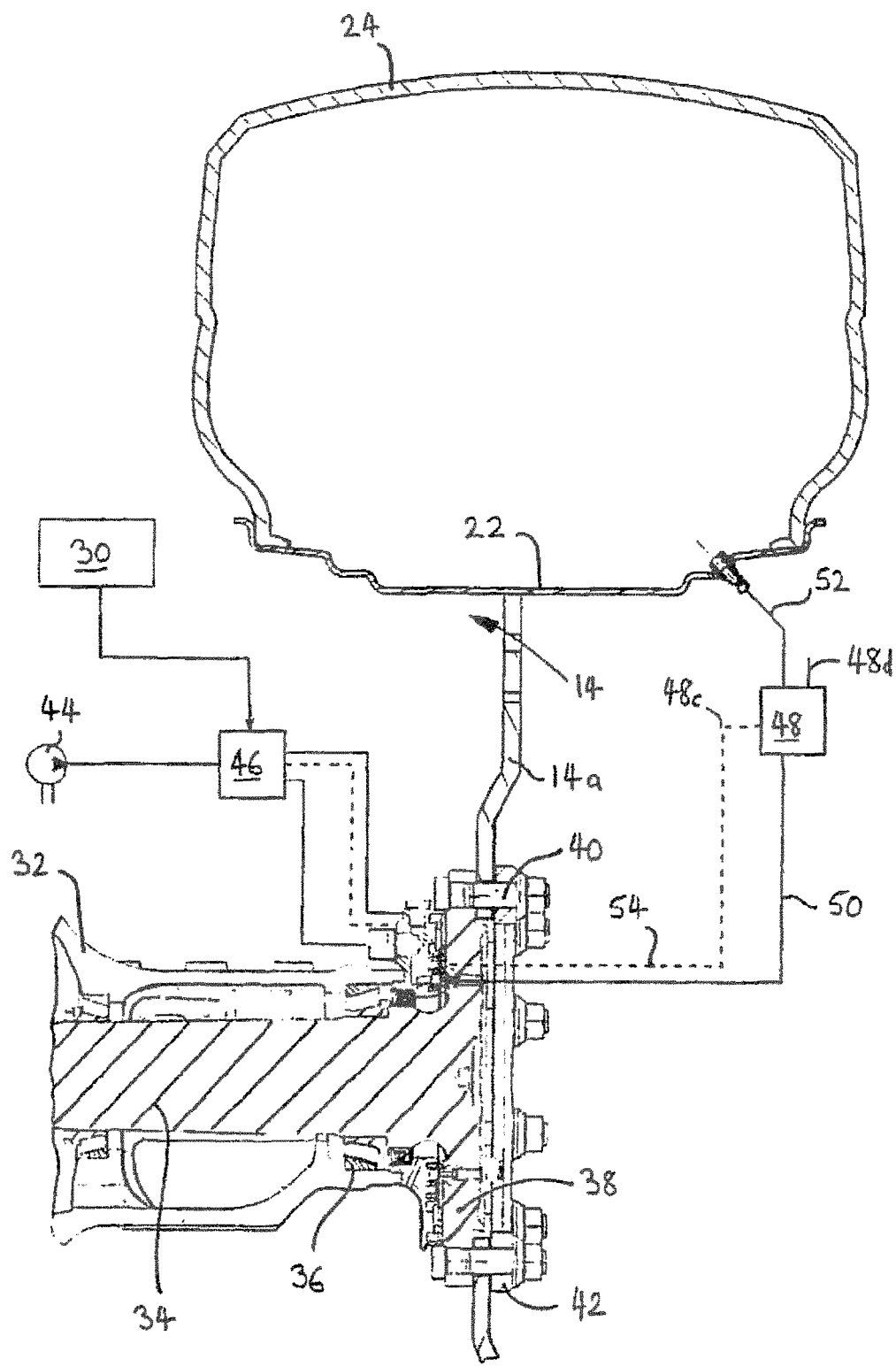
FIG. 2 is a sectional elevation through part of the rear axle and wheel of the vehicle of FIG. 1 showing detail of a tyre inflation system.

FIG. 2 shows part of a tractor rear axle, shown in cross-section, having an outer trumpet housing 32 within which a driveshaft 34 is supported by bearings 36. Driveshaft 34 terminates in a hub flange 38 to which a wheel disc 14a of wheel 14 is clamped by bolts 40 and a clamping ring 42.

The wheel disc 14a carries the wheel rim 22 on which the pneumatic tyre 24 is mounted. A tyre inflation feed arrangement conveys compressed air from a compressor 44 (driven by prime mover 18) via one or more air control valves 46 mounted on the tractor to the rotating wheel 14 and hence via an air control valve 48 mounted on the wheel to the interior of the tyre 24 via lines 50 and 52. Control valves 46 are suitably solenoid control valves which are controlled by the control unit 30. Control valve 48 is a biased pressure controlled valve which opens the air flow from line 50 and thereby compressor 44 to line 52 and the interior of the tyre 24 when the control inlet 48c is charged with air via control line 54. In the non-activated condition of valve 48, line 50 is connected to ambient discharge line 48d while the line 52 is blocked and line 50 is connected to the ambient discharge line 48d. Further details of the construction of a hub arrangement as shown in FIG. 2 may be found in, for example, the applicants European patent application EP-A-2625049.

To increase the air pressure in the tyre 24, air from the compressor 44 is supplied to control valve 48 via supply line 50. At the same time, the control inlet 48c of control valve 48 is charged with air via control line 54, so that the passage to line 52 and the interior of the tyre 24 is open. Thereby, pressure in the tyre 24 is increased.

If it is desired to release some air pressure from within the tyre the control inlet 48c of control valve 48 is charged with air via control line 54, so that supply line 50 is connected to the line 52 and hence the interior of the tyre 24. At the same time, a control valve 46 is switched into a position so that the interior of the tyre is connected to the ambient environment so the tyre pressure inside the tyre 24 is decreased.

A method for controlling the agricultural vehicle of FIGS. 1 and 2 will now be described with reference to the flow chart of FIG. 3 which commences at step 100 with obtaining the slippage characteristic 98 for the used wheel rim and tyre combination. The slippage characteristic is determined empirically and relates the respective driving torque T at which the frictional coupling between driven wheel rim and tyre begins to slip for each of a range of tyre pressures P (or the respective tyre pressure P at which the frictional coupling between driven wheel rim and tyre begins to slip for each of a range of driving torque T values).

The next step 102 is to determine the current tyre pressure P, from a pressure sensor associated with the tyre inflation system of FIG. 2. Following this, at step 104 the current driving torque T is determined. There are a number of ways in which this may be accomplished. For example, where power is delivered by a continuously variable transmission (CVT) connectable to all wheels, from operating parameters of the CVT, the transmission output torque (approximately equal to the wheel drive torque) may be found. Alternatively, a continuously variable transmission (CVT) may be provided with output being connectable to different axles as described in EP 1 990 229 A wherein the two hydraulic motors of the CVT can be drivingly connected to solely one of the front or rear axles.

Where the transmission is a hydro-mechanical power-split gear box, the torque may be derived from oil pressure in the hydrostatic circuit. Alternatively, for example, in self-propelled harvesting machines such as combines or forage harvesters, the power is delivered by solely by hydraulic motors assigned to an axle of a vehicle or each wheel of a vehicle. In this case the current driving torque T can be determined for each axle or wheel and thereby the T/P values indicating that slippage between tyre and rim is on the point of occurring can be stored in a characteristic 98 per axle or per wheel.

Further alternative options for deriving wheel drive torque include:
  Current consumption of an electrical wheel hub motor/gear motor
  Torque measurement at the gear output
  Calculation models depending on the output torque of the combustion engine (primary mover, energy source)

At step 106 a check is made as to whether the current T/P values indicate from the characteristic 98 that slippage between tyre and rim is on the point of occurring—that is to say if an "allowable point" for the tyre is to be exceeded. If the wheel drive torque is going below/higher than a particular level, for the tyre allowable point, the tyre pressure will increase/decrease automatically. In the method of FIG. 3, if the check at step 106 indicates no slip, then the process loops back to preceding step 104. If step 106 is affirmative for slipping, a further check step 108 identifies whether the tyre pressure P is at a maximum level, which maximum level may simply be specified for the tyre or may be modified by reference to the operating mode of the vehicle.

If step 108 is affirmative for maximum pressure, then at step 110 the drive torque is limited or reduced to prevent slipping, following which the process reverts to step 104. If step 108 is negative for maximum pressure, then at step 112 the tyre pressure is increased (to increase the friction due to pressure between tyre 24 and rim 22; FIG. 2) and the process reverts to step 102.

Although suitably carried out as an automated process, as an alternative, following indication of slipping (actual or imminent) from step 106, set points for correction may be sent to the driver.

Figure 3:
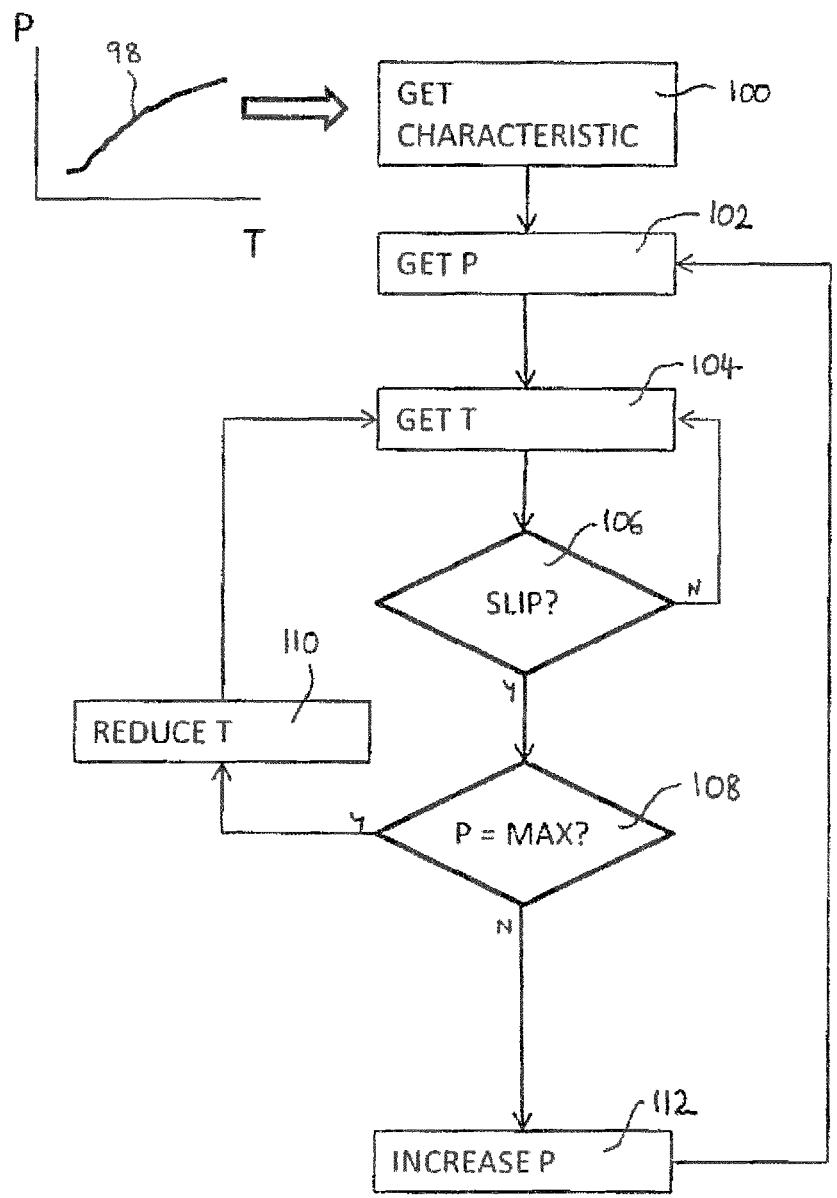
FIG. 3 is a flow chart representation of a method for controllably varying air pressure in one or more tyres of the vehicle of FIGS. 1 and 2.

On a vehicle where the torque can be determined per axle or per wheel, the tyre pressure adjustment according FIG. 3 may be different for each axle or wheel. Similar, different T/P characteristics may be assigned to each axle of a vehicle due to tyre configuration, e.g. a tractor having different sized tyres on front and rear axle.

The allowable point relation between wheel drive torque and tyre pressure is independent of traction power, axle load etc. If traction power/drag force or roll resisting forces/downhill-slope forces etc. (generally everything that influences the balance of power during transmission of forces between tyres and ground) is changing, the calculated characteristic pair of values of wheel drive torque/tyre pressure stays the same, because only drive torque is relevant for the transmission between tyre and rim and not how that force (circumferential force at the contact point of tyre/ground) distributes on traction power, roll resisting power, downhill-slope force etc.

The control system of the invention may be further configured to account for the allowable point relation between wheel drive torque and tyre pressure being influenced by further parameters. For example, the frictional coupling between driven wheel rim and tyre may also depend on the temperature of the tyre. If the tyre temperature increases, the tyre becomes more elastic so that the contact areas between tyre and rim are less tensioned/biased/preloaded. Initially, the tyre is heated up with increasing ambient temperature, which temperature value is available to the control system being already determined for other purposes such as the cab air conditioning. As mentioned above, the tyres are also heated up, especially at high speed, because of higher flexing work, so the vehicle speed may be a further parameter supplied to the control system. Alternatively to the indirect determination described above the the tyre temperature may be measured directly by a temperature senor in the tyre body.

Accordingly, in addition to the characteristic 98 shown in FIG. 3, further characteristics may be provided showing the T/P values for various tyre temperatures or, if indirectly determined, for various ambient temperatures or various vehicle speeds. Other influencing parameters affecting the characteristic (or resulting in a family of characteristics) may also be captured. For example, the property of tyres changes during lifetime, so the operating time of a tyre may be monitored to provide a further characteristic variation depending on the operating time.

Figure 4:
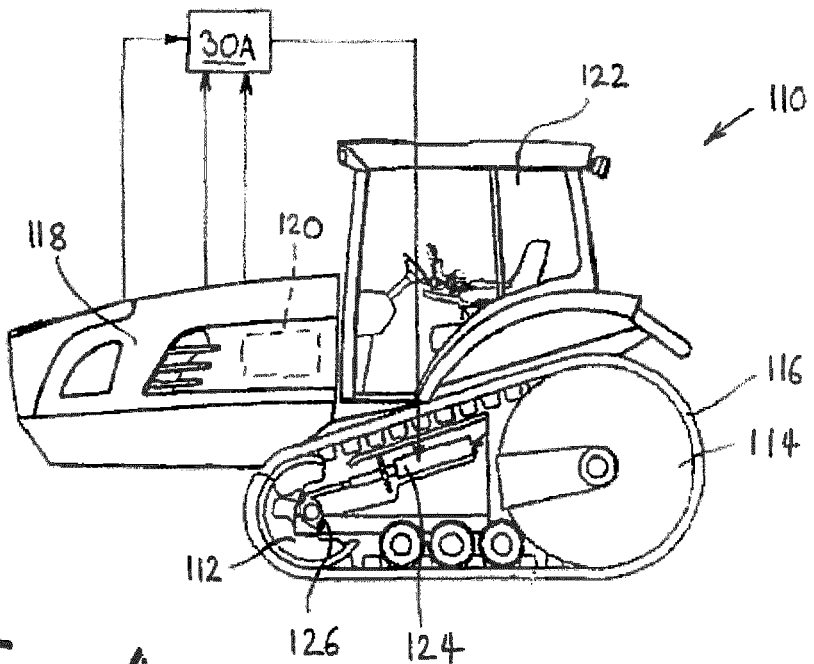
FIG. 4 is a side elevation of a further configuration of agricultural vehicle embodying the present invention.

Referring now to FIG. 4, an alternative configuration of agricultural vehicle in the form of a tracked tractor 110 is shown having front idler wheels 112, rear drive wheels 114 which together carry a track 116. The tractor 110 has an engine cover 118 enclosing engine 120 and an operator cab 122 which is supported by a tractor chassis (not shown). The tractor 110 has a driveline (not shown) which provides the vehicle with propulsive drive to the rear drive wheels 114 by, for example, mechanical or hydrostatic drive connection. Motive power is delivered to the track 116 by frictional engagement between the inner surface of the track 116 and the outer peripheral surface or rim of the rear drive wheel 114.

A control system, represented schematically at 30A and equivalent to that at 30 in FIG. 1, includes data processing and storage components. The control system 30A is connected to receive vehicle operating performance measurement data, such as driving torque, fluid pressure, electrical current etc. The vehicle includes a track tensioning mechanism including a fluid cylinder 124 operating on a crank 126 to which the front idler wheel 112 is coupled, such that varying pressure in the cylinder 124 varies the tension in the track 116 and hence also the friction between the inner surface of the track 116 and the outer peripheral surface or rim of the rear drive wheel 114. In analogous manner to the control of tyre pressure described above, the control system 30A is operable to controllably vary the pressure in the cylinder 124 in dependence on driving torque and a slippage characteristic between the rim of drive wheel 114 and track 116. In the method flowchart of FIG. 3, the reference to tyre pressure is replaced by track tension (which may be derived from a pressure in the cylinder 124 of the tensioning mechanism). As will be recognised, other track tensioning mechanisms, for example based on electro-mechanical actuation rather than a fluid cylinder, may be used.

In the foregoing the applicants have described an agricultural vehicle and method of controlling the same are provided, the vehicle having a motive power unit providing a driving torque to at least one driven wheel and having at least one tyre or track frictionally coupled with the periphery of the driven wheel. A vehicle operating parameter is controlled in dependence on the driving torque and a slippage characteristic relating the respective driving torque at which the frictional coupling between driven wheel and tyre or track begins to slip for a range of vehicle operating parameter values. The operating parameter is suitably a tyre pressure or track tension, and the control may involve reducing driving torque or increasing pressure/tension to prevent slipping.

From reading the present disclosure, other modifications will be apparent to persons skilled in the art. Such modifications may involve other features which are already known in the field of agricultural machines and component parts thereof and which may be used instead of or in addition to features already described herein. For example, as an alternative to operating the vehicle with a received slippage characteristic, a self-learning system would be possible in which the vehicle recognizes that the tyre or track is slipping (with pressure drop, loss of speed, position transmitter output being among factors that may be utilised to identify slip) and storage of the pair of values (tyre pressure/drive torque). This may be taken further to generate a curve of the slippage characteristic by operating the vehicle at each of a plurality of tyre pressures (or track tension values) and, for each, increasing the driving torque and noting the torque value at which slippage between driving wheel and tyre (track) commences.

The invention claimed is:

1. A control system for an agricultural vehicle having a motive power unit providing a driving torque to at least one driven wheel having a periphery with a rim and having at least one pneumatic tyre mounted on and frictionally coupled with the rim of the at least one driven wheel;
the pneumatic tyre having an air pressure;
the control system being arranged to control the air pressure in dependence on a performance measurement of the vehicle and a slippage characteristic of the at least one pneumatic tire; characterised in that the performance measurement is of the driving torque and the slippage characteristic related to the respective driving torque at which the frictional coupling between the at least one driven wheel and the pneumatic tyre begins to slip for each of a plurality of air pressure values.

2. The control system according to claim 1, wherein the driving torque measurement is calculated from an oil pressure in a hydrostatic circular flow having at least one hydraulic pump driven by the motive power unit and at least one hydraulic motor connected with the at least one driven wheel.

3. The control system according to claim 2, where the hydrostatic circular flow is a hydrostatic branch of a hydromechanical power-split gear box.

4. The control system according to claim 2, where the hydrostatic circular flow is a hydrostatic branch comprising at least one hydraulic motor drivingly connected to one ground engaging member.

5. The control system according to claim 2, where the hydrostatic circular flow is a hydrostatic branch comprising at least one hydraulic motor drivingly connected to one vehicle axle which is drivingly connected to at least two ground engaging members.

6. The control system according to claim 1, wherein the motive power unit comprises an electric motor and wherein the driving torque is calculated from the current consumption of said electric motor.

7. The control system as claimed in claim 1, for a vehicle having at least two pneumatic tyres, each mounted on a rim of a respective driven wheel on a vehicle axle, wherein the control system is operable to vary the air pressure in a first tyre independent of the air pressure in a further tyre.

8. The control system as claimed in claim 1, being further arranged to adapt the air pressure control by reference to a temperature indicating value.

9. An agricultural vehicle comprising the control system as claimed in claim 1.

10. A method of controlling an agricultural vehicle having a motive power unit providing a driving torque to at least one driven wheel having a periphery with a rim and having at least one pneumatic tyre frictionally coupled with the rim of the at least one driven wheel, the pneumatic tyre having an air pressure and the method comprising:
controlling the air pressure in dependence on a performance measurement of the vehicle and a slippage characteristic of the; pneumatic tyre, characterised in that the performance measurement is of the driving torque and the slippage characteristic related to the respective driving torque at which the frictional coupling between the at least one driven wheel and the pneumatic tyre begins to slip for each of a plurality of air pressure values.

11. The method as claimed in claim 10, wherein the agricultural vehicle has a continuously variable transmission driven by the motive power unit, the method further comprising calculating the driving torque from one or more measured operating parameter values of said transmission.

12. The method as claimed in claim 10, further comprising generating a curve of the slippage characteristic by operating the vehicle at each of said plurality of air pressure values and, for each, increasing the driving torque and noting the torque value at which slippage between the driven wheel and the pneumatic tyre commences.

13. A control system according to claim 1, wherein the control system comprises a storage component and the slippage characteristic is a curve stored in the storage component.

14. A control system according to claim 13, wherein the curve is generated by operating the vehicle at each of said plurality of air pressure values and, for each, increasing the driving torque and noting the torque value at which slippage between the at least one driven wheel and the pneumatic tyre commences.

15. A control system as claimed in claim 1 wherein the slippage characteristic may be adapted by reference to one or more of the following: tyre temperature, ambient temperature, vehicle speed and tyre operating time.

* * * * *